United States Patent [19]

Rote et al.

[11] 4,040,678
[45] Aug. 9, 1977

[54] BEARING ASSEMBLY

[75] Inventors: Everett A. Rote, Corona; Edward G. Smith, Riverside, both of Calif.

[73] Assignee: Xerox Corporation, Stamford, Conn.

[21] Appl. No.: 636,338

[22] Filed: Nov. 28, 1975

[51] Int. Cl.² .............................................. F16C 29/04
[52] U.S. Cl. .................................................. 308/6 R
[58] Field of Search ................. 308/6 R, 201, 217, 3.8

[56] References Cited

U.S. PATENT DOCUMENTS

| | | | |
|---|---|---|---|
| 2,880,040 | 3/1959 | Gomersall | 308/3.8 |
| 2,998,635 | 9/1961 | Burritt et al. | 308/217 X |
| 3,145,065 | 8/1964 | Cator | 308/6 R |

Primary Examiner—Joseph F. Peters, Jr.
Assistant Examiner—Gene A. Church
Attorney, Agent, or Firm—James J. Ralabate; Franklin C. Weiss; Michael J. Colitz, Jr.

[57] ABSTRACT

This invention relates to a bearing assembly and more particularly to a bearing assembly which has parts slidable with respect to each other and with roller members therebetween so the assembly functions free from unwanted contaminating elements such as lubricants, chips, flakes, or the like, thereby rendering the assembly readily adaptable for use in environments such as electroplating applications which must be maintained clean of such unwanted elements.

1 Claim, 2 Drawing Figures

BEARING ASSEMBLY

BACKGROUND OF THE INVENTION

Any bearing surface that is to be used in an electroplating environment must be so constructed so that flakes, dust particles, lubricants, or the like from the bearing are kept out of the plating bath. To this end, the best result would be obtained through a bearng assembly which could operate free of unwanted particles such as lubricants, dust particles, flakes, or the like. Particles from a bearing assembly or other adjacent environmental origins stand the possibility, if deposited into the bath, of turning the characteristics of the entire electrolysis bath, plugging holes improperly in articles to be plated in the bath, or forming a foreign substance on the surface to be plated whereby plating cannot be properly achieved. Such is particularly true in the plating or printed circuit boards to which environment this invention is particularly applicable.

In the past, plating equipment had been furnished with friction type bearings having wear pads of a plastic material. The plastic material did not require lubrication. However, there would inevitably be a slight dust condition distributed into the air as the pad would wear through repetitive cycles of operation. This dust would float on the surface of, or into the plating solution and could contaminate the holes of the printed circuit boards being coated. Any metal that might wear from such bearing adjacent the plastic pads could contaminate and turn the entire solution to an undesirable characteristic.

Other bearings commonly used in electroplating environments included those with the moving bearing element contacting, or submerged in, a lubricating solution. While it is possible to encase the solution to some limited degree, the chance always existed that errant portions of the solution would enter the electroplating solution in the bath or tank. Further, as the lubricating solution became depleted replacement of the depleted portion would be required. When this was done as by manual means or any mechanical means the risk was further created of improperly depositing a quantity of lubricating solutions into the bath.

To overcome these deficiences the bearing assembly of the instant invention was devised which resulted in a bearing assembly requiring no lubrication and with the moving parts or elements so constructed and arranged so that flakes or chips would not be generated during repeated cycles of operation.

It is therefore an object of the instant invention to overcome the deficiences of the prior art through an improved bearing assembly.

Another object of the instant invention is a bearing assembly which is easily constructed; or repaired and which has easily replaceable parts.

Another object of the instant invention is a low cost bearing which is self-centering even by an unskilled operator.

Another object of the instant invention is a bearing assembly free of lubricating fluids and which will not flake, chip, or otherwise distribute unwanted particles into the environment.

These and other objects of the instant bearing assembly will become obvious when read in light of the instant specification and claims and accompanying drawings wherein:

Figure 1:
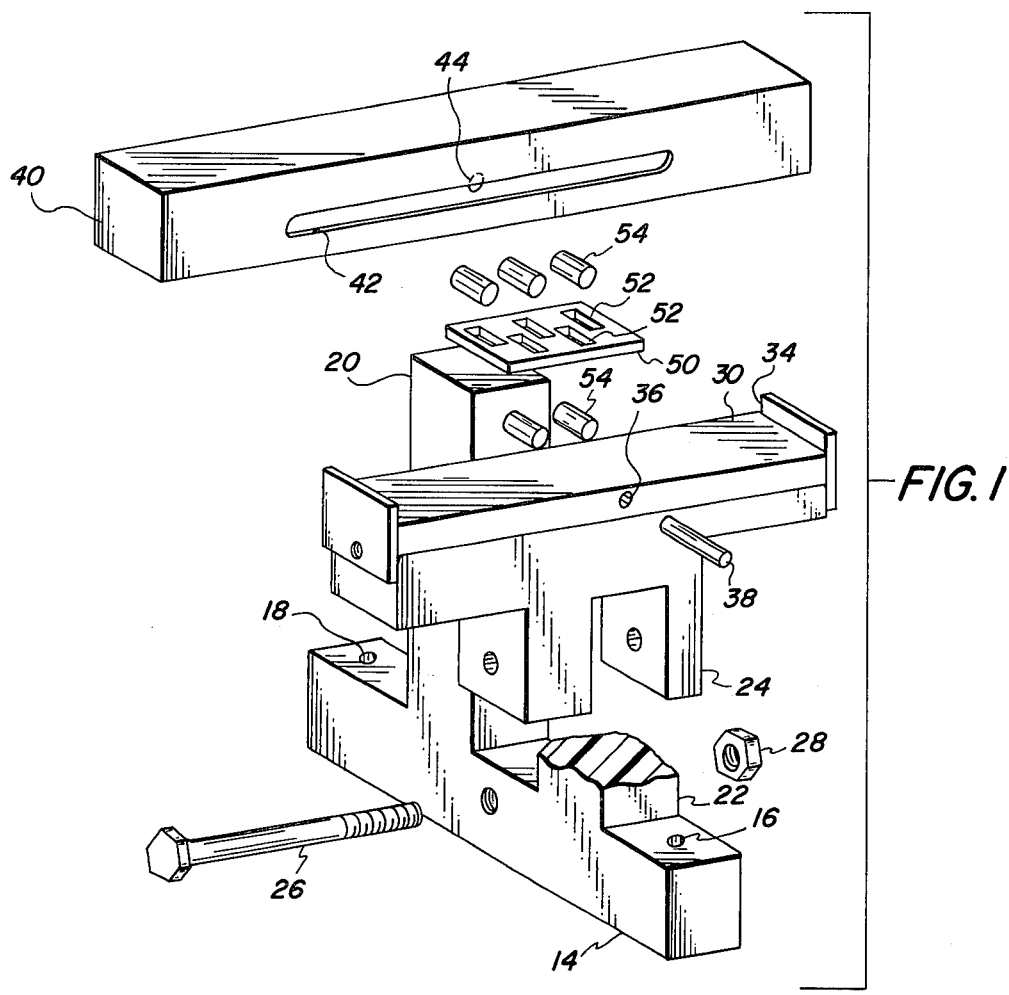
FIG. 1 is an exploded view of the elements of the bearing assembly.
Figure 2:
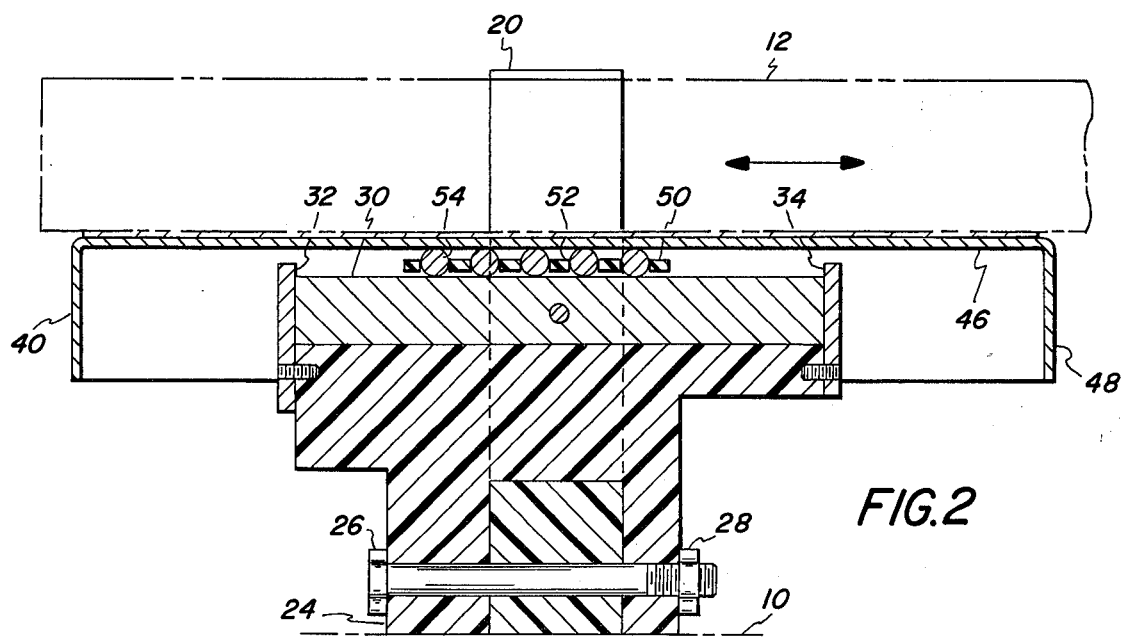
FIG. 2 is a sectional view through the operating elements of the bearing assembly as shown in FIG. 1 with the fixed mounting base and reciprocating arm shown in phantom configuration.

The bearing assembly is adapted for mounting on a fixed side rail 10, showing phantom lines, of the electroplating bath. Also shown in phantom lines is the reciprocal rod 12 or agitator bar which is adapted for movement longitudinally, in the direction of the arrows, with respect to the fixed side rail for the purpose of reciprocating the printed circuit boards attached thereto for oscillation within the bath.

Mounted to the fixed side rail 10 in semi permanent relationship is a main support bracket 14 with apertures 16 and 18 aligned with apertures in the fixed side rail. Mounting thereto may be accomplished with bolts and nuts. During normal operation the main support bracket will not be removed from the fixed side rail nor will it be removed during changing of the bearing assembly for replacement of parts. The main support bracket has upstanding arms 20 and 22 in which are mounted the removable portions of the bearing assembly and in which the reciprocal rod is positioned for guiding its movement relative to the fixed side rail.

A removable support bracket 24 has downwardly extending arms which are adapted to straddle the base portion of the main support bracket. Mating apertures in these two brackets permit the use of bolt and nut 26 and 28 for rigidly maintaining these bracket elements with respect to each other during operation or for separating them for maintenance.

In the changing of the bearing assembly, bolt 26 and nut 28 are removed for easy replacement or removal of worn portions of the bearing assembly. In the use of the instant bearing assembly in an electrolysis environment both the main support bracket and removable support bracket are preferably constructed of an insulating plastic material whereby the fixed side rail and reciprocal rod may be a metallic anode and cathode, respectively, and not complete an electric circuit, and thereby detract from the electroplating process being carried out in the bath.

The upper surface of the removable support bracket preferably includes a hard metallic surface 30 such as stainless steel with stainless steel end retaining walls 32 and 34. Stainless steel is selected for various parts of the assembly because of its hardness and wearability and its resistance to flaking, chipping, or otherwise changing its surface characteristics during normal sliding or rotary reciprocation as occurs in bearing environments. Stainless steel is also resistive to the normally corrosive atmosphere of an electroplating solution. The removable support bracket 24 is provided with hole 36 and tightly fitted pin 38 for a purpose later to be described. The pin, however, is generally of a length equal to the length of the hole through the removable support bracket.

Mounted for sliding motion on top of the removable support bracket is a housing 40. The housing is provided on one of its longitudinal faces with a guide slot 42 for receiving an outstanding portion of the retaining pin 38 during operation. The opposite downwardly extending face of the housing 40 includes a pin receiving aperture 44 of a diameter slightly larger than the pin 38. In this manner the pin may be moved in one direction or another through either the guide slot 42 or pin removing aperture 44 so that in normal operation the guide 38 extends slightly into the guide slot 42 but during construction or repair the pin may be centered in hole 44 so that the housing may be removed from the removable support bracket. In normal operations, however, the guide slot, with the pin therein, defines the direction and length of motion of the housing and reciprocal rod relative to the support brackets and fixed side rail and bath.

The housing is preferably formed of stainless steel for the same reasons as described with respect to the slide surface 30 of the removable support bracket. Of particular importance is the hardness of the inner face 46 of the housing 40 since it is a wear receiving surface. Downwardly extending flanges 48 extend from the inner face 46 of the housing 40 for encasing and enclosing the bearing members and insuring its proper motion as well as for prohibiting motion beyond that which is intended.

A retainer member 50 is positioned between the inner face 46 of the housing 40 and the slide surface 30 of the removable support bracket. The retainer member may be plastic such as polypropelene. Within the retainer member are a plurality of windows 52 within which are placed bearing cylinders 54, preferably, of stainless steel. Stainless steel is used in the bearing, moving members since it is very resistent and not attacked by the environmental fumes. The bearing cylinders are of such size as to have a diameter greater than the thickness of the retaining member but of a length slightly shorter than the windows. Cylinders used as bearing elements minimize the driving power necessary to drive the assembly. The windows and hence the cylinders are staggered for smoother operation.

When the retainer 50 is placed on the center of the slide surface of the removable support bracket with bearing cylinders in its windows, the housing 40 may then be placed over top of the assembly, also in a centered fashion. The retaining pin 38 must be totally within the removable support bracket at this time. The pin is then slid within hole 36 whereby it extends slightly into the guide slot 42 for guiding its motion. The entire upper bearing assembly is then located over the main support bracket 14 with nut and bolt 26 and 28 operatively connected to hold the unit in place. The reciprocal rod 20 may then be placed on top of the upper surface 54 of the housing within the upwardly extending arms of the removable support bracket. One or both of these contacting surfaces, i.e. the upper surface 54 of the housing or the lower surface of the reciprocal rod may be abraded or provided with suitable friction imparting material to reduce the possibility of slippage when the reciprocable bar is set upon the housing and the assembly operates. Alternatively, the reciprocal rod and housing may be suitably pinned. Reciprocation on the bearing may then be readily accomplished.

In the preferred mode of operation the length of throw of the reciprocal rod is such that the ends of the retainer never contact the end surfaces 32 and 34 of the slide surface 30. In the event that the retainer is set upon the upper surface of the removable bracket at other than the center and the housing located thereover, a single reciprocation of the reciprocating rod will center the retainer 50 and its slide bearings 54 due to a sliding of the retainer and bearing cylinders as the end of the retainer is pushed by one end retaining wall 34.

As can be seen from the foregoing detailed description of the bearing assembly of the instant invention, the device is simple, efficient and clean making it well suited for the instant, and other, environments.

While the instant invention is described in a particular embodiment hereof, it is not intended to be so limited but to be protected broadly within the scope of the appended claims.

What is claimed is:

1. For use in an electroplating bath environment, a bearing assembly including:
    an electrically insulating mounting assembly on a fixed electroplating bath,
    an upper stainless steel surface on said mounting assembly,
    a reciprocal member movably mounted above the upper stainless steel surface and having a stainless steel lower surface,
    a retainer member movably mounted on said upper surface with a plurality of apertures therein,
    a plurality of stainless steel bearing cylinders movably mounted within the apertures of said retainer member to contact said upper and lower surfaces and constitute a roller bearing assembly,
    means to impart reciprocation to said upper and lower surfaces whereby a bearing action is imparted to the moving elements by the rolling action of the cylinders,
    said reciprocal member having downwardly extending flanges with a longitudinal slot formed in one of said flanges,
    an aperture in said mounting assembly transverse to the direction of motion of said reciprocal member and
    a pin slidably mounted in the aperture of said mounting assembly, said pin being movable in said aperture from a first position wherein it rides in the longitudinal slot of said reciprocal member for guiding the motion between said reciprocal member and said mounting assembly, said pin being movable in said aperture to a second position wherein it is within said aperture but not in the longitudinal slot to permit the removal of said reciprocal member from said mounting assembly.

* * * * *